United States Patent [19]

Vieths

[11] 4,023,300
[45] May 17, 1977

[54] BAIT HOLDER ARRANGEMENT

[76] Inventor: Alman H. Vieths, 6411 Monterey Road, Space 18, Los Angeles, Calif. 90042

[22] Filed: Mar. 2, 1976

[21] Appl. No.: 663,054

[52] U.S. Cl. .............................................. 43/41.2
[51] Int. Cl.² ..................................... A01K 97/04
[58] Field of Search .............. 43/41.2, 43.12, 43.14

[56] References Cited

UNITED STATES PATENTS

| | | | |
|---|---|---|---|
| 2,475,736 | 7/1949 | Burrous | 43/41.2 |
| 2,914,883 | 12/1959 | Kustusch | 43/41.2 |
| 3,163,957 | 1/1965 | Barrett | 43/41.2 |
| 3,214,858 | 11/1965 | Louie | 43/41.2 |
| 3,753,309 | 8/1973 | Bryant | 43/41.2 X |

Primary Examiner—Louis G. Mancene
Assistant Examiner—Daniel J. Leach
Attorney, Agent, or Firm—Don B. Finkelstein

[57] ABSTRACT

A bait holder arrangement for holding bait in a cavity of a body member during casting of the bait to prevent the bait from tearing free of the hook. A body member is provided with walls defining a bait holding cavity and the bait holding cavity has a closed end and an open end. A buoyant member such as foam plastic or any other structure having a specific gravity less than 1.0 is positioned in the cavity adjacent the closed end. A flap means is positioned adjacent the open end of the cavity and moveable from an open position wherein the open end of the body member is open to a closed position wherein bait or other material in the bait holding cavity is retained therein. A water soluble retention means holds the flap means in a closed postion until the bait holder is in the water. When it is in the water, the water soluble retention means dissolves. A hinge means is provided for coupling the flap means to the body member and biases the flap means to the open position. The hinge means, the flap means, and the body member are unitarily fabricated. An eye means is provided on the external surfaces of the body member and a leader line is connected to the eye means and the other end of the leader line extends into the bait holding cavity through a line receiving aperture between the flap means and the body member. The leader line has a hook on the end within the cavity for holding the bait. During casting, the main fishing line is connected to the eye and the bait is held within the bait holding cavity and comparatively low forces are imposed thereon during casting. When the body member enters the water, the water soluble retention means dissolves allowing the flap to open and the bait floats free of the bait holding cavity and is retained in a conventional manner on the hook of the leader line.

6 Claims, 3 Drawing Figures

BAIT HOLDER ARRANGEMENT

BACKGROUND OF THE INVENTION

1. Field of the Invention

This invention relates to the bait holding art and more particularly to an improved bait holder useful in casting bait to prevent damage to the bait.

2. Description of the Prior Art

There have heretofore been proposed several types of bait holding arrangements for securely retaining the bait during casting thereof in order to prevent the hook, which generally goes through the bait, from pulling free due to forces imposed during the casting operation.

One such prior art bait holding arrangement was generally formed of a body member having walls defining a bait holding cavity and a closed upper end to provide flotation. A closure means was adjacent to an opening end of the bait holding cavity and a separate hinge means was utilized to retain the closure means on the body member. To bias the closure member to the opened position there was often utilized a spring or similar material.

Various types of latch means, including the use of water soluble devices, were utilized in the above mentioned bait holder arrangement for temporarily retaining the closure means in the closed position during the casting thereof.

Such a bait holder arrangement had several disadvantages. It was comparatively expensive to fabricate and, since the closure means, hinge, and body member were not fabricated of a unitary structure, additional cost and expense as well as complications associated with fabrication and assembly arose. Such costs and complications prevented the bait holder arrangement above described from achieving widespread success.

Therefore, in many applications it is desirable to provide a bait holder arrangement to securely hold the bait in place and limit the forces imposed thereon during the casting and yet being comparatively economical to fabricate, of rugged and long lasting life and of high reliability.

SUMMARY OF THE INVENTION

Accordingly, it is an object of the present invention to provide an improved bait holder arrangement.

It is another object of the present invention to provide an improved bait holder arrangement useful in casting the bait.

It is yet another object of the present invention to provide an improved bait holding arrangement that may be economically fabricated, easily utilized, of rugged construction and provide a long operational life.

The above, and other objects of the present invention are achieved, according to a preferred embodiment thereof, by providing a body member having a closed end and an open end and walls defining a bait holding cavity betweeen the closed end and the open end. A buoyant flotation means which, for example, may be a foam plastic or any other material having a specific gravity less than 1.0 is coupled to the interior of the bait-holding cavity adjacent to the closed end thereof.

A flap means is adjacent the open end of the cavity and the flap means is moveable from an open position allowing free entrance and egress from the bait holding cavity to the closed position wherein bait or other material contained in the bait holding cavity is retained therein. The flap means and body member define a line receiving aperture therebetween when the flap means is in the closed position. The hinge means is coupled to both the body member and the flap means and resiliently biases the flap means towards the open position.

In order to provide the economical fabrication it is, of course, desirable that the entire, or at least as much of the entire bait holder arrangement as possible, be unitarily fabricated. When the above described structure is unitarily fabricated from a molded polypropylene it has been found that a surprising result can be achieved. That is, the hinge means is a "live" hinge means that automatically provides the resilient biasing of the flap means to the open position.

The flap means is also provided with a tab means which, in this embodiment of the invention, is adjacent external surfaces of the body member for the flap means in the closed position. The body member is provided with walls defining a retention chamber surrounding the flap means. A water soluble retention means is frictionally retained between the flap means and the walls defining the retention chamber to hold the flap means in the closed position. The water soluble retention means may, for example, be a pill-type structure such as aspirin, alka seltzer tablets, or the like. Utilization of such comparatively inexpensive devices for the retention means provides further economy in the overall use and operation of the bait holder arrangement according to the principles of the present invention.

An eye means is provided on the external surfaces of the body member and, preferably, adjacent the closed end thereof and the fishing line, which is utilized to cast the bait holder arrangement, is coupled to the eye means. Additionally, a leader line is coupled to the eye means, preferably by a conventional swivel, and the remote end of the leader line is provided with a conventional hook. The bait is placed on the hook and inserted into the bait holding cavity. The leader line passes through the line accepting aperture between the flap means and the body member when the flap is closed and the water soluble retention means is inserted to hold the flap closed.

The bait holder may then be cast and, in accordance with the principles of the present invention, the leader line does not impose any substantial force on the hook or the bait tending to pull the hook free from the bait. When the bait holder enters the water, the water soluble retention means dissolves, allowing the "live" hinge to resiliently bias the flap to the open position. Since a buoyant member is provided adjacent the closed end of the bait holder cavity, the closed end floats in a vertically uppermost position due the predetermined buoyant force thereof and the bait then falls from the bait holding cavity under the force of gravity.

BRIEF DESCRIPTION OF THE DRAWINGS

The above and other objects of the present invention may be more fully understood from the following detailed description taken together with the accompanying drawings wherein similar reference characters refer to similar elements throughout and in which.

DESCRIPTION OF THE PREFERRED EMBODIMENTS

Figures 1, 2, 3:
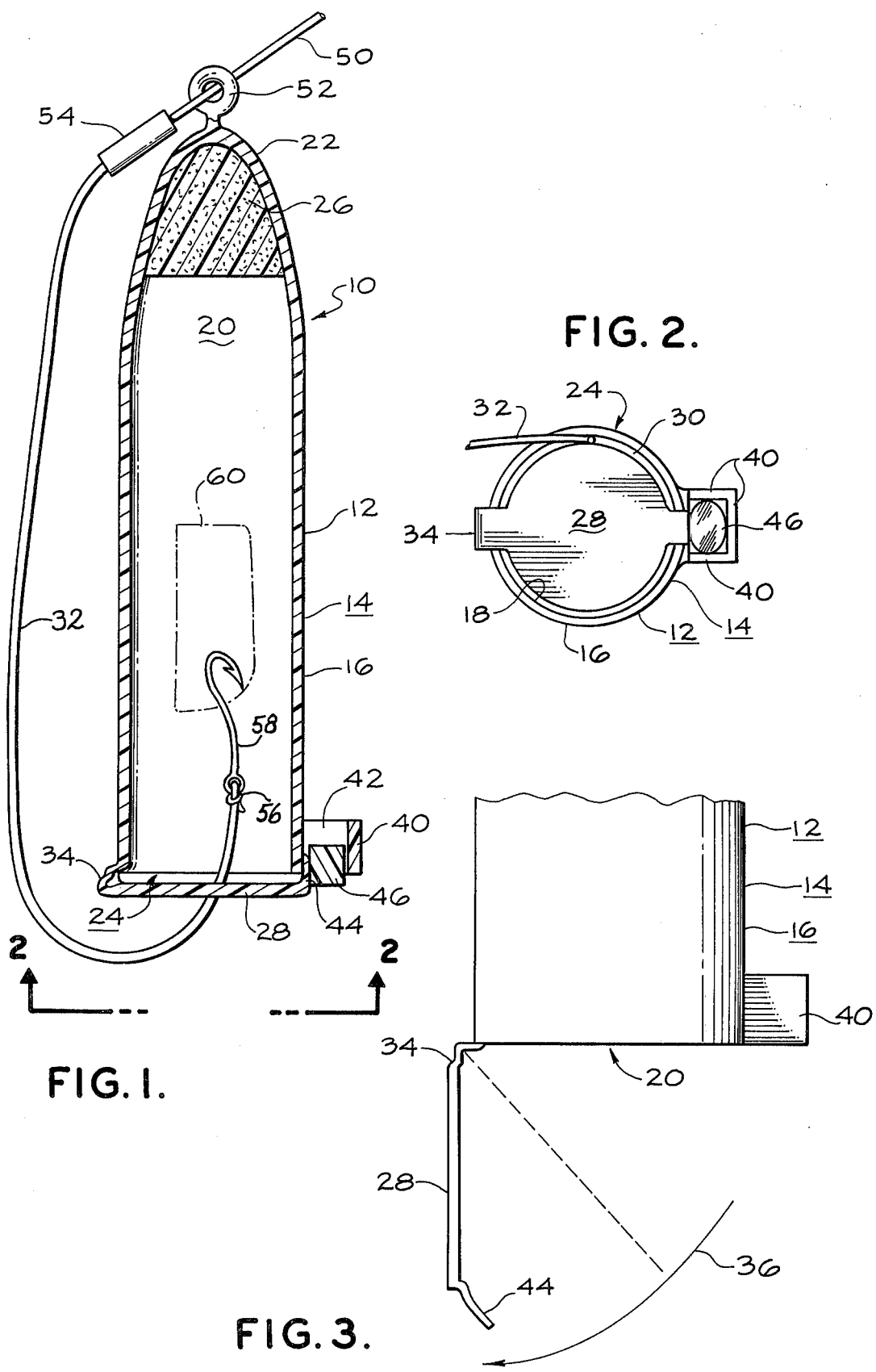
FIG. 1 is a sectional view of one embodiment of the present invention.
FIG. 2 is a view along the line 2—2 of FIG. 1.
FIG. 3 illustrates the flap means of the present invention in the open position thereof.

Referring now to the drawings there is illustrated, in FIGS. 1, 2, and 3 thereof, a preferred embodiment of the present invention, generally designated 10. The embodiment 10 generally comprises a body member 12 having walls 14 with external surfaces 16 and internal surfaces 18. The internal surfaces 18 of the body member 12 define a bait holding cavity 20 having a closed end 22 and an open end 24.

A flotation means 26 is coupled in a bait holding cavity at the closed end 22 thereof to provide a predetermined buoyancy force when the embodiment 10 is immersed in the water. The flotation means 26 may be any desired material having a specific gravity less than 1.0 and may, for example, be fabricated of styrofoam or any other comparatively inexpensive material. The flotation means 26 may be bonded or otherwise secured in the bait-holding cavity 20. The size of the flotation means 26 is selected to provide a predetermined buoyant force which, in the preferred embodiments of the present invention, provides the embodiment 10 floating on the water with the end 22 thereof in a vertically upward position.

A flap means 28 is adjacent the open end 24 of the bait holding cavity and the flap means is moveable from a closed position, as shown in FIG. 1, to an open position as shown in FIG. 3.

As shown most clearly in FIG. 2, for the flap means 28 in the closed position, the flap means 28, together with the walls 14 of the body member 12, define a line receiving aperture 30 between the body member 12 and the flap means 28. The line receiving aperture is provided to allow entrance to the bait holding cavity 20 of, for example, a leader line 32 when the flap means 28 is in the closed position illustrated in FIGS. 1 and 2.

A hinge means 34 is coupled to the body member 12 and to the flap means 28. The hinge means allows the flap means 28 to move from the closed position, shown in FIGS. 1 and 2, to the open position shown in FIG. 3. A surprising result has been found in utilizing molded polypropylene as the material for fabricating the embodiment 10. When such a material is utilized, the body member 12, hinge means 34 and flap means 28 may be unitarily molded and the hinge means 34 provides a "live" hinge. That is, the hinge means 34 tends to bias the flap means 28 into the open position, as indicated by the arrow 36 in FIG. 3. Therefore, the preferred embodiments of the present invention utilizes, as the material from which the embodiment is fabricated, a material which will allow unitary fabrication of the body member, hinge and flap and in which the hinge means provides a resilient biasing of the flap means to the open position thereof.

The body means 12 is also provided with walls 40 defining a retention chamber 42. The retention chamber 42, in the embodiment shown in the drawing, is on the external surfaces 16 of the body member 12. However, it will be appreciated, if desired, it may also be provided in the bait holding cavity 20.

The flap means 28 is provided with a tab means 44 which is positioned in the retention chamber 42 when the flap means is in the closed position shown in FIG. 1.

The flap means 28 may be retained in the retention chamber 42 by a water soluble retention means 46. The water soluble retention means, for economy, may be fabricated from such common materials as aspirin, alka seltzer, bromo seltzer, or the like. In general, the less expensive the water soluble retention means 46 is the more economical is continued operation of the embodiment 10.

In order to provide the benefits of economy of fabrication and comparatively long life, as well as operational suitability, as shown in the drawing, it is preferred that the hinge means 34 and flap means 44 be of comparatively thin cross-section as compared with the cross-sectional thickness of the body member and the flap means 28. Such comparatively thin section, on the order of one fifth of the thickness of the body member or the flap means, provides the above described "live" hinge action that is desired.

In operation, a fishing line 50 which may be connected to a fishing pole (not shown) is coupled to the eye means 52. The eye means 52 is coupled to the body member 12 in regions adjacent the closed end 22 thereof. The leader line 32 is also coupled to the eye means 52 through a conventional swivel 54. The remote end 56 of the leader line is connected to a conventional fishing hook 58 which engages the bait generally designated 60.

When it is desired to utilize the device, the bait 60 is engaged with the hook 58 on the leader end 56 and placed in the bait holding cavity 20. The flap 28 is positioned in the closed position and the tab 44 is wedged into the retention chamber 42 by the water soluble retention means 46.

It will be appreciated that the water soluble retention means 46 provides a frictional retention of the tab means 44 in the retention chamber 42.

When the fishing line 50 casts the bait holder 10, it can be seen that the forces associated with the casting do not impose any forces between the hook 58 and the bait 60. Acceleration forces imposed upon the bait cause the bait to bear against the inner surfaces 18 of the body member 12.

When the body member 12 strikes the water the water soluble retention means 46 commences to dissolve and releases the tab means 44. the "live" hinge 34 then biases the latch means 28 to the open position, as shown in FIG. 3, allowing the bait to fall free into the water.

This concludes the description of the preferred embodiments of the present invention. From the above, it can be seen that there has been provided an improved bait holder arrangement that may be economically fabricated in a rugged configuration compatible with the environment in which the bait holder is to be utilized and give a long operational service life.

The appended claims are intended to cover all variations and adaptations falling within the true scope and spirit of the present invention.

I claim:

1. A bait holder arrangement of the type adapted to hold the bait during casting thereof and release the bait after the holder enters the water and comprising, in combination:
   a body member having a closed end and an open end and walls defining a bait holding cavity between said open end and said closed end;
   a flotation means in said bait holding cavity adjacent said closed end thereof and having a predetermined buoyant force when said body member is immersed in water;
   flap means adjacent said open end of said body member and said flap means movable from an open position to allow bait to leave said bait holding cavity to a closed position for retaining bait in said bait holding cavity, and said flap means and said body member defining a line receiving aperture therebetween when said flap mean is in said closed position;

hinge means coupled to said body member and said flap means for retaining said flap means thereon and providing said movement from said open to said closed position thereof, and said hinge means biasing said flap means to said open position; and said flap means and said hinge means are formed unitarily with said body member.

2. The arrangement defined in claim 1 and further comprising:

eye means coupled to external surfaces of said body member adjacent said closed end thereof;

leader line means having a first end coupled to said eye means and having a bait holding hook means on a second end thereof, and said leader line positionable in said line accepting aperture to dispose said hook means in said bait holding cavity when said flap means is in said closed position.

3. The arrangement define in claim 1 and further comprising:

water soluble retention means for temporarily holding said flap means in said closed position and for dissolving in the water to release said flap means and thereby release said bait from said bait holding cavity.

4. The arrangement defined in claim 3 wherein: said body member is fabricated from polypropylene.

5. The arrangement defined in claim 2 wherein:

said flap means has a tab means thereon;

said body member has walls defining a retention cavity;

said tab means of said flap means is positionable in said retention cavity of said body member when said flap means is in said closed position thereof; and said water soluble retention means further comprises;

a water soluble pill-like member for frictional retention between said tab means and said walls defining said retention chamber.

6. The arrangement defined in claim 5 wherein:

said retention cavity is external said bait holding cavity and is substantially rectangular in cross-sectional configuration.

* * * * *